United States Patent [19]

Harrington et al.

[11] 3,821,485

[45] June 28, 1974

[54] CALL DENIAL CIRCUIT

[75] Inventors: Richard John Harrington, Oakland; Arnold Edward Low, San Francisco; Michael John Sturtevant, Berkeley, all of Calif.

[73] Assignee: American Telephone and Telegraph Company, New York, N.Y.

[22] Filed: Dec. 7, 1972

[21] Appl. No.: 312,979

[52] U.S. Cl. .............................................. 179/18 DA

[51] Int. Cl. .............................................. H04m 3/38

[58] Field of Search .................... 179/18 DA, 18 EB

[56] References Cited

UNITED STATES PATENTS

| | | | |
|---|---|---|---|
| 3,553,382 | 1/1971 | Knox et al. | 179/18 DA |
| 3,671,677 | 6/1972 | Lee, Jr. et al. | 179/18 EB |

*Primary Examiner*—Kathleen H. Claffy

*Assistant Examiner*—Mitchell Saffian

*Attorney, Agent, or Firm*—H. J. Walsh; C. H. Davis

[57] ABSTRACT

A call denial circuit is disclosed for restricting selected calls outgoing from PBXs (Private Branch Exchanges) over central office lines. It includes a call denial line circuit which registers and counts the first three digits dialed over a line as well as a continuously operating scanner which sequentially causes the registered digits and digit count of a number of line circuits to be checked by a common check circuit. The check circuit detects if restricted calls are being placed and generates restrict signals accordingly. A call status register associated with each line circuit is actuated by the scanner to register restrict signals and terminate a restricted call.

10 Claims, 4 Drawing Figures

CALL DENIAL CIRCUIT

BACKGROUND OF THE INVENTION

This invention relates to call restriction arrangements for telephone communication systems and, in particular, to an improved common control circuit arrangement for screening calling digits.

One of the most widely used call screening arrangements utilizes a combined register-check circuit which is associated with an outgoing line on every call. The circuit continuously monitors the line, records each dialed digit, detects invalid dial codes, and effects the release of the calling connection if the dialed digits represent a restricted code. Inasmuch as these circuits remain connected to the line during dialing, long holding times are experienced, particularly on the subscriber originated calls from a private branch exchange (PBX). In order to ensure that sufficient numbers of these circuits are available to screen every call from a busy PBX, it is oftentimes necessary to provide almost one such circuit for every trunk.

The disadvantages of the foregoing arrangements have led to the development of commonly provided check circuits which can be time shared by a group of registers and thereby concurrently serve many calls. In these systems, the digit monitoring and recording functions are associated with separate registers and the common check circuit contains the detection apparatus needed for verifying dialed codes. Each register which is continuously associated with a particular call generates a start scan signal following the recording of every digit. This signal serves to activate a scanner which locates and identifies the register and to indicate that code translation service is required.. The register is connected to the common check circuit and the recorded contents of the register are then forwarded to the common check circuit where they are then compared against a list of allowed codes. When the dialed code is invalid, the register is signaled to release the call connection, and if valid or an insufficient number of digits are recorded to complete screening, the register is signaled to release the common check circuit. Accordingly, depending largely on the origin of the call and the complexity of the restricted code pattern, the scanner may be activated numerous times to screen a single call.

While commonly provided check circuits advantageously effect earlier release of restricted calls by screening the contents of a register after the receipt of each digit, relatively complex control circuitry must be furnished in each register and scanner to generate the start scan signals, to detect and respond to these signals, and to control the removal of these signals. In addition, unless costly call allotting equipment is also furnished, all register circuits are not served equally by the common check circuit and some calls may go unscreened. Accordingly, the need arises for an effective and yet simple control arrangement for use in common check circuit arrangements to control and to allot connections between each register circuit and the common check circuit to ensure the screening of recorded contents after each digit is stored.

SUMMARY OF THE INVENTION

The foregoing needs of the prior art are solved in an illustrative embodiment of our invention in which a common check circuit periodically screens, in sequential order, a plurality of call denial digit registers which are individually associated with particular lines to record call data. The connection of each digit register to the common check circuit is accomplished under control of a free running scanner which is being operated at a rate such that the recorded contents of each digit register are screened, or checked, after each dialed digit is stored therein. Advantageously, our free running scanner eliminates the need for complex control circuitry in each digit register to generate a start scan signal and to remove such signals after a restrict call determination is made. In addition, the complex control circuitry of prior art scanners which responds to a start scan signal to start its scanning, to stop its scanning upon finding the digit register that has generated a start scan signal, and to time the release of the scanner so as to respond to subsequent start signals, is eliminated.

During the interval that the common check circuit is checking the contents of a particular register, the stored data is gated into the check circuit. If the data corresponds to the identity of a restricted call address, a restrict signal is generated that eventually causes the call associated with the connected one of the digit registers to be terminated. In our arrangement the restrict signal is distributed to every call status register but the concurrent presence of a scan signal generated by the free running scanner at only the connected one of the digit registers causes the restrict signal to be registered in the latter register.

In this illustrative embodiment of our invention, the digit register is part of a line circuit which is individually associated with each central office line. The digit register has a capacity to record the first three call directing digits received over the associated line. In addition, each line circuit also includes a digit counter for counting the first three digits received.

In addition to the foregoing, our control facilities at each line circuit include readout gates which are connected to the register and counter, and a call status register for recording call restrict signals. Each readout gate is enabled in a predetermined order by the free running scanner to cause the stored information, i.e., digits and digit count, of each line circuit to be forwarded to the common check circuit.

Considering our arrangement in more detail, it may be facilely integrated into a call denial arrangement which serves PBXs from which outgoing calls may be placed by dialing the conventional preliminary access digit "9." The calling PBX station is thereby connected to a PBX outgoing trunk circuit and central office line to place a call outside the PBX. A call denial line circuit is connected to each central office line and it includes a dial pulse counter, digit register, and digit counter. The pulse counter records the dial pulses of each digit dialed over the associated central office line, and the digit counter counts the number of digits dialed. Upon counting a digit, the digit counter causes the pulse counter contents to be transferred to the digit register and the pulse counter is then cleared to count the dial pulses of the next dialed digit.

Each call denial line circuit also comprises output gates which are connected to the digit register and digit counter. During each scan cycle the scanner enables the output gates associated with each line circuit and the enabled gates transfer the contents of the associated register and counter into the common check circuit.

BRIEF DESCRIPTION OF THE DRAWING

Our invention will be more clearly understood by reading the following description of an exemplary embodiment of our invention in conjunction with the drawing, in which:

In FIGS. 1 through 3 the equipment has been given a single alphabetic and/or numeric designation which is prefixed by a single digit indicating the figure in which the equipment is located. Thus, for example, the pulse counter is assigned the numeric designation 12 and, if it is referred to as counter 1–12 in the specification, it is the appearance of counter 12 in FIG. 1 that is being referred to.

GENERAL DESCRIPTION

Figure 1:
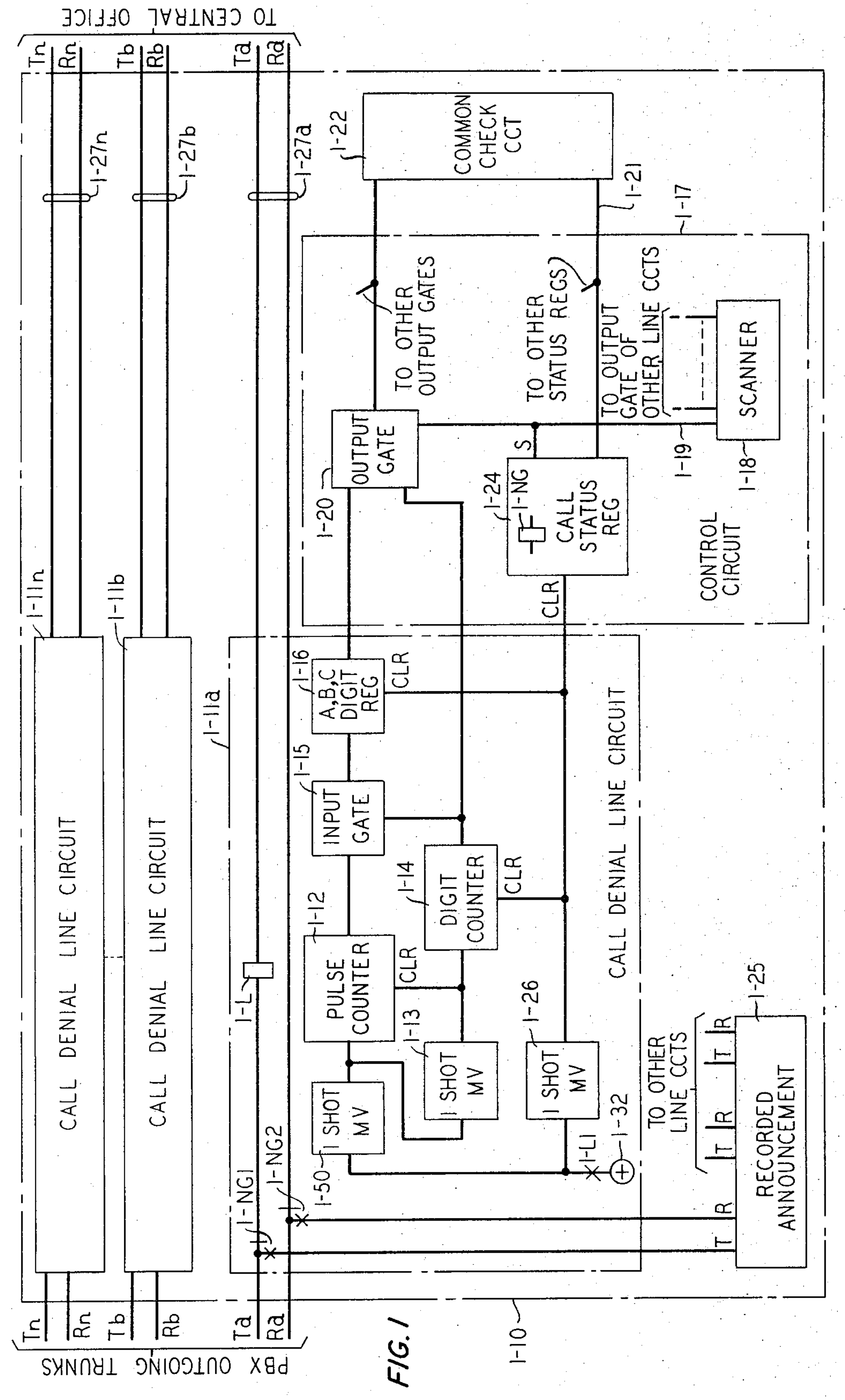
FIG. 1 is a block diagram of call denial equipment utilizing a simplified control circuit in accordance with this illustrative embodiment of our invention.

Referring to FIG. 1, there is shown call denial circuit 1–10, in accordance with this embodiment of our invention, which is shown located on a customer's premises but which may also be located in a central office for ease of maintenance. Circuit 1–10 includes a plurality of call denial line circuits 1–11*a*, 1–11*b*, through 1–11*n* which are individually connected in series with ones of central office lines 1–27*a*, 1–27*b*, through 1–27*n*, between outgoing trunks of a PBX (not shown) and a central office switching machine (not shown). Line circuit 1–11*a* representatively shows the circuit details of each of the line circuits in block diagram form. Included in line circuit 1–11*a* are a digit register 1–16 and a digit counter 1–14 which respectively register and count the first three digits dialed over line 1–27*a* to establish an outgoing call thereover. A common check circuit 1–22 is used to check the contents of the digit register and digit counter in each of the line circuits to determine if the contents thereof indicate a restricted call is being placed. Check circuit 1–22 is individually associated with ones of line circuits 1–11*a*, 1–11*b*, through 1–11*n*, under the control of control circuit 1–17 which utilizes free-running scanner 1–18 to sequentially associate each of the line circuits with check circuit 1–22 for a restricted call determination. Advantageously, scanner 1–18 operates at a rate that causes the registered digits and digit count in each of the line circuits to be checked by check circuit 1–22 after each of the first three digits dialed over central office lines 1–27*a*, 1–27*b*, through 1–27*n*. Control circuit 1–17 includes an output gate, such as gate 1–20, for each of the line circuits to connect the registers and counters to check circuit 1–22. Scan pulse outputs from scanner 1–18 sequentially energize each of the output gates to pass the contents of the register and counter in each of the line circuits to check circuit 1–22 for the restricted call determination. In line circuit 1–11*a*, the output of digit register 1–16 and digit counter 1–14 are input to output gate 1–20 which is energized by scan pulses on lead 1–19 from scanner 1–18.

Control circuit 1–17 also includes a call status register, such as register 1–24, for each of the line circuits. These call status registers store a call restrict signal generated by check circuit 1–22 in response to a determination that the call over the associated line is restricted. Upon a restricted call determination being made by check circuit 1–22, the check circuit applies the call restrict signal to lead 1–21 and from there is distributed to each of the call status registers. However, the call restrict signal is only stored in the particular call status register associated with the line circuit of which the registered digits and digit count are presently being checked by check circuit 1–22. This is accomplished by the concurrent presence of a scan pulse at the particular call status register. When a call being established over line 1–27*a* is to be restricted, the call restrict signal on lead 1–21 is caused to be stored in call status register 1–24 by the concurrent presence of the scan pulse on lead 1–19 at scan input S of call status register 1–24. Status register 1–24 thereby causes relay 1–NG to be operated, indicating a restricted call, and break contacts 1–NG1 and 1–NG2 thereof cause the calling party to be disconnected from central office line 1–27*a*. Make contacts 1–NG1 and 1–NG2 of relay 1–NG cause the calling party to be connected to recorded announcement 1–25 which instructs the calling party to hang up and recall the PBX operator in order to complete the call.

More particularly, line circuit 1–11*a* operates as now described. Line circuit 1–11*a* includes a relay 1–L which is connected in series with lead T*a* of central office line 1–27*a* and responds to on-hook and off-hook supervision and dial pulsing on line 1–27*a*. Make contact 1–L1 of relay 1–L repeats these circuit conditions. Various circuits in line circuit 1–10 respond to the signaling and supervisory signals repeated by contact 1–L1 to count and register the first three digits dialed over line 1–27*a* as described hereinafter.

In line circuit 1–10 contact 1–L1 closes in response to an off-hook supervision signal on line 1–27*a*, and momentarily opens the contact for each subsequent dial pulse. One-shot multivibrator 1–50 responds to each dial pulse opening of contact 1–L1 to generate a shaped pulse which is counted by dial pulse counter 1–12. Retriggerable one-shot multivibrator 1–13 is responsive to the shaped pulses for a dialed digit to provide an indication of each digit dialed and, accordingly, is used to drive digit counter 1–14. Multivibrator 1–13 responds to the leading edge of each shaped pulse output from multivibrator 1–50, but has a timing period such that it does not time out before it is retriggered by the leading edge of the next pulse. At the end of dial pulsing of a digit, however, multivibrator 1–13 does time out. In this manner, multivibrator 1–13 generates an elongated pulse which ends shortly after the end of pulsing of each digit. Digit counter 1–14 is incremented in response to the end of each elongated pulse from multivibrator 1–13 to count the number of digits dialed and provides an output, accordingly, after each of the first three ("A," "B," and "C") digits dialed. Once digit counter 1–14 is incremented, the pulse count in counter 1–12 is transferred to an appropriate storage location in digit register 1–16. Pulse counter 1–12 must then be cleared to count shaped dial pulses for the subsequently dialed digit. To accomplish this, the output from digit counter 1–14 is used to energize input gate 1–15 to transfer the pulse count of the "A," "B," or "C" digits in counter 1–12 to an appropriate storage location in register 1–16 and then counter 1–12 is cleared by multivibrator 1–13 to count pulses of the next digit dialed. To clear pulse counter 1–12, each elongated pulse output from multivibrator 1–13 is also applied to the clearing input CLR of the counter which responds to the end of each elongated pulse to be cleared.

In accordance with the teaching of our invention, free-running scanner 1–18 in control circuit 1–17 is used to sequentially read out the existing contents of register 1–16 and counter 1–17 and the registers and counters (not shown) in line circuits **1–11*b* through 1–11*n* to be checked by common check circuit 1–22. Scanner 1–18 operates at a rate that the contents of the digit counter and register in each line circuit are checked every 2 milliseconds. This alows a restricted call to be detected at the earliest possible time, and the associated PBX trunk and line are released to be available for another outgoing call. We turn now to describe how the above occurs in line circuit 1–11*a*. Every 2 milliseconds, scanner 1–18 applies a scan pulse via lead 1–19 to output gate 1–20 and to call status register 1–24. The scan pulse energizes output gate 1–20 and thereby causes the digit count of counter 1–14 and the digits stored in register 1–16 to be gated out to check circuit 1–22 to be checked. Assuming the information checked indicates a restricted call, check circuit 1–22 generates a call restrict signal on output lead 1–21. This restrict signal is applied to call status register 1–24, which is associated with line circuit 1–11*a*, and to the call status registers associated with each of the other line circuits. The restrict signal on lead 1–21 however, is caused to be registered only in call status register 1–24 by the concurrent presence of the scan pulse at scan inputs thereof. In response to the registration of the restrict signal, register 1–24 operates relay 1–NG, and its transfer contacts 1–NG1 and 1–NG2** opens leads T*a* and R*a* of line **1–27*a* toward the central office and connect the calling PBX station to recorded announcement 1–25** which instructs the calling party to hang up and recall the PBX operator in order to complete the call.

For a nonrestricted or allowed call, subsequent to the "C" digit dialed over line **1–27*a*, further dial pulsing is not acted upon by call denial circuit 1–10, for counter 1–14 and register 1–16 have no more capacity to count or store digits. Scanner 1–18 causes the contents of counter 1–14 and register 1–16** to be checked every 2 milliseconds during the allowed call, but this does not matter. No further circuit action is taken till the call is terminated.

Placing the calling PBX station on-hook, following restriction or termination of a call, causes the various registers and counters in line circuit **1–11*a* to be cleared or reset to process another call over line 1–27*a*. Retriggerable one-shot multivibrator 1–26 is utilized to perform this function. The closure of make contact 1–L1, in response to off-hook supervision on line 1–27*a*, at the beginning of a call, triggers multivibrator 1–26 and its output goes from high to low. As long as contact 1–L1 remains closed, multivibrator 1–26 remains in its retriggered state and its output remains low. When contact 1–L1 opens, multivibrator 1–26 begins to time a 200 millisecond output pulse, at the end of which the output of the multivibrator returns to its normally high state. The opening of contact 1–L1 in response to each dial pulse is short enough, however, that multivibrator 1–26 does not time out, but rather is retriggered upon the reclosing of the contact. As a result, the output of multivibrator 1–26 remains low for the duration of a call on line 1–27*a*. Upon termination of an attempted or completed call contact 1–L1 is open for greater than 200 milliseconds and multibrator 1–26 times out and its output returns to its normally high state. This high output is applied to the clearing inputs CLR of digit counter 1–14, status register 1–24, and digit register 1–16 all of which are thereby cleared or reset to process a subsequent call over line 1–27*a*. Clearing status register 1–24 causes the release of relay 1–NG, if it is operated, and the PBX outgoing trunk is thereby reconnected to central office line 1–27*a*. When the output of multivibrator 1–26 is low, upon an off-hook condition of line 1–27*a*,** all of the aforementioned registers and counters are enabled to function as previously described.

DETAILED DESCRIPTION

REGISTRATION OF DIGITS

Figure 2:
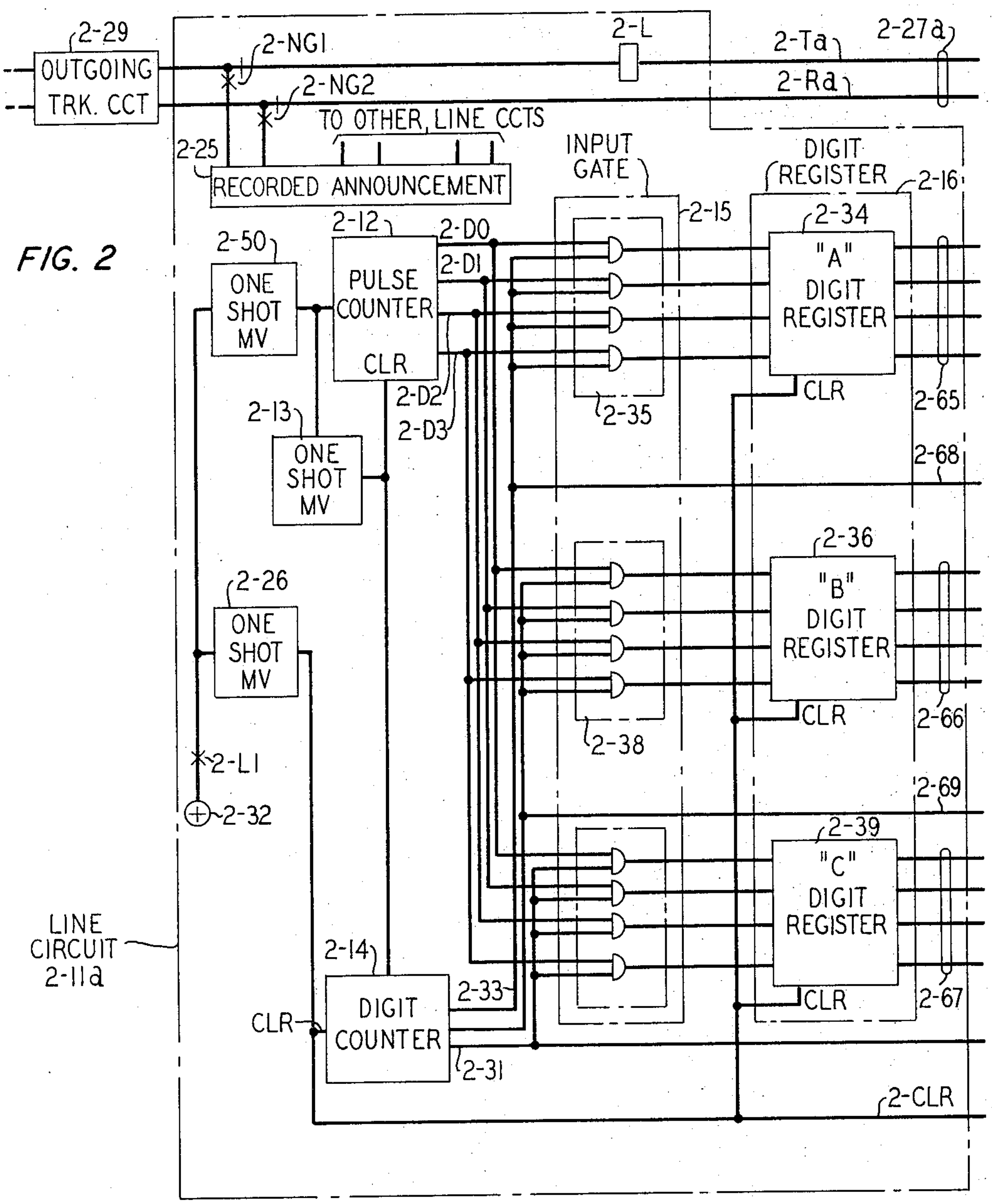
FIG. 2 is a schematic diagram of a call denial line circuit in accordance with our invention.
Figure 4:
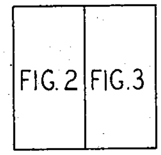
FIG. 4 shows the manner in which FIGS. 2 and 3 should be arranged to simplify tracing the circuits.

In FIG. 2, a PBX station (not shown), at which the digit "9" has been initially dialed to make an outgoing call, is connected via outgoing trunk circuit 2–29, call denial line circuit **2–11*a*, and central office line 2–27*a* to central office 3–30 to make the call. Current flows through transmission leads 2–T*a* and 2–R*a* of the line, in a manner well known in the art as an off-hook supervisory signal and operates relay 2–L. Relay 2–L is responsive to on- and off-hook supervisory signals and dial pulsing on line 2–27*a* and repeats these conditions via its make contact 2–L1 to circuitry in line circuit 2–11*a*. As now described, one-shot multivibrator 2–50 is responsive to repeated dial pulses and shapes them to be counted by pulse counter 2–12 and then registered in appropriate ones of digit registers 2–34, 2–36, and 2–39.**

To count and register dial pulses, closure of make contact 2–L1, in response to an off-hook condition, connects potential 2–32 to the input of one-shot multivibrators 2–50 and 2–26. Multivibrator 2–50 does not respond to the connection of potential 2–32 to its input, but responds to each removal of the potential from its input to generate a 70 millisecond shaped pulse which is counted by dial pulse counter 2–12. Each dial pulse causes contact 2–L1 to open, so multivibrator 2–50 generates a shaped pulse in response thereto. The shaped pulses output from multivibrator 2–50 also energize retriggerable one-shot multivibrator 2–13 which generates a single pulse for each digit dialed. Each pulse from multivibrator 2–13 is utilized to clear and enable pulse counter 2–12, and to drive digit counter 2–14 which counts digits and causes dial pulses to be stored in appropriate ones of registers 2–34, 2–36, and 2–39. Multivibrator 2–13 functions as follows. The leading edge of the first shaped dial pulse for each digit dialed triggers multivibrator 2–13 and its output goes low, but the multivibrator has a 150 millisecond timing period so it is retriggered by subsequent dial pulses because its timing period is greater than the period between any two dial pulses for a single digit. Accordingly, the leading edge of the second and subsequent shaped pulses, if any, for the dialed digit retrigger multivibrator 2–13 before it times its 150 millisecond output pulse and causes its output to return to its normal high state. After the last shaped pulse for each dialed digit, however, multivibrator 2–13 is not retriggered an it times out. The result is that the output of multivibrator 2–13 goes from high to low at the leading edge of the first shaped pulse for each digit and the output does not return to its normal high state until 150 milliseconds after the end of the last shaped pulse for each digit.

As mentioned previously, multivibrator 2–13 is used to clear and enable pulse counter 2–12 to count dial pulses and to drive digit counter 2–14 which counts the number of digits dialed. To clear and enable counter 2–12, the output of multivibrator 2–13 is connected to clearing input CLR of pulse counter 2–12. The output of multivibrator 2–13 goes low at the first shaped dial pulse of each digit and input CLR going low enables counter 2–12 to count the dial pulses. When the output of multivibrator 2–13 goes high at the end of each dialed digit, however, counter 2–12 is cleared and is thereby ready to count shaped dial pulses of a subsequent digit. The number of digits dialed are counted by digit counter 2–14 which also responds to the pulses output from multivibrator 2–13. The output of multivibrator 2–13 is connected to the input of digit counter 2–14, which does not respond to the high to low transition at the start of each elongated pulse output from multivibrator 2–13, but responds to the low to high transition at the end of each elongated pulse to count the number of digits dialed.

Turning now to describe the registration of the first three digits dialed, as the first digit is dialed over line 2–27*a* from the calling PBX station, the supervisory current flowing through leads 2–T*a* and 2–R*a* of line 2–27*a* is interrrupted a number of times equal to the numerical value of the digit dialed, in a manner well known in the art. These current interruptions cause relay 2–L to be released and reoperated a corresponding number of times, and its contact 2–L1 opens and closes correspondingly to repeat the dial pulses. One-shot multivibrator 2–50 responds to each dial pulse opening of contact 2-L1 to generate a 70 millisecond shaped pulse which is counted by counter 2–12. After pulses for the first digit are counted by counter 2–12, the pulse count in counter 2–12 is transferred via leads 2–65, 2–66, and 2–67 to "A" digit register 2–34 of digit register 2–16 and stored therein. This is accomplished in the following manner. As previously described, digit counter 2–14 is incremented one count in response to the trailing edge of each elongated pulse output from multivibrator 2–13. The one count in digit counter 2–14 causes a high output therefrom on output lead 2–33 and is applied to one of the two inputs of the four two-input gates designated 2–35. This causes the digit stored in pulse counter 2–12, and output therefrom on leads 2-D0 through 2-D3 in BCD form, to be transferred and stored in "A" digit register 2–34. Finally, multivibrator 2–13 causes counter 2–12 to be cleared, as previously described, to count shaped dial pulses for the second digit dialed.

Dial pulsing for the second digit is processed in the manner just described for the first digit. Dial pulses shaped by multivibrator 2–50 are counted by counter 2–12 and multivibrator 2–13 increments the count of digit counter 2–14 to the count of two. The second digit pulse count in counter 2–12 is transferred to "B" digit register 2–36 via gates 2–38 in the same manner in which counter 2–14 caused the first digit to be stored in register 2–34, and counter 2–12 is again cleared to prepare for counting shaped dial pulses for the third digit.

Similarly, the third digit is registered and then stored in "C" digit register 2–39.

CHECKING REGISTERED DIGITS

Figure 3:
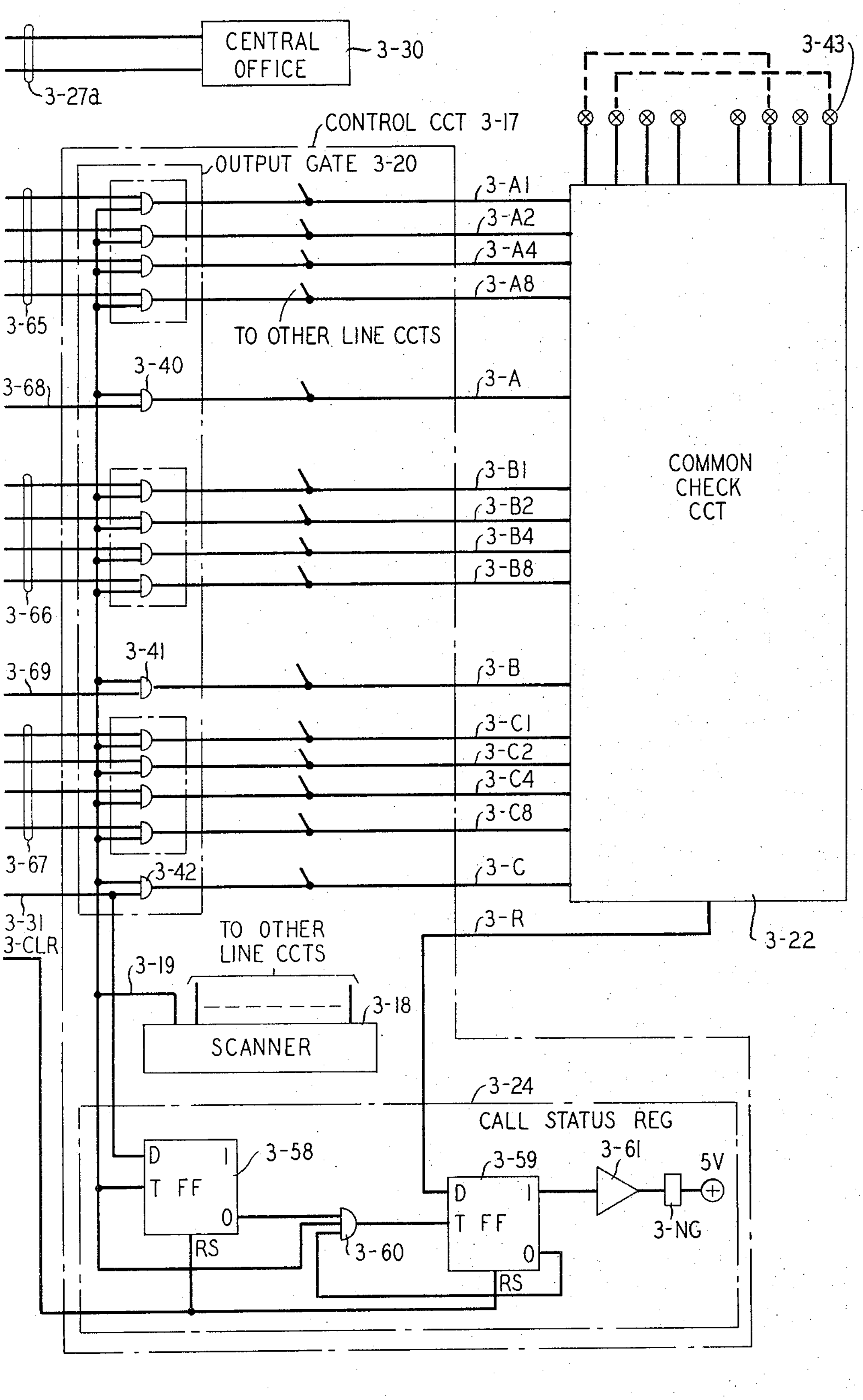
FIG. 3 is a schematic diagram of the simplified control circuitry and common check circuitry in accordance with our invention.

In FIG. 3, in accordance with this embodiment of our invention, is shown control circuit 3–17. Circuit 3–17 includes output gate 3–20 which connected to the outputs of digit registers 2–34, 2–36, and 2–39, and digit counter 2–14, and also includes call status register 3–24 which is associated with line circuit 2–11*a*. In addition, control circuit 3–17 includes free running scanner 3–18 which controls the operation of output gate 3–20 and status register 3–24.

Output gate 3–20 and the other output gates (not shown) are advantageously sequentially energized by free-running scanner 3–18 to pass the contents of their associated digit registers and digit counters to common check circuit 3–22 where restricted call determinations are made. Scanner 3–18 sequentially applies 50 microsecond pulses to the scan lead of call denial line circuit 2–11*a* and the other call denial circuits (not shown) every 2 milliseconds. The scan pulse for line circuit 2–11*a* is present on lead 3–19 and it is distributed to call status register 3–24 and output gate 3–20. The scan pulse on lead 3–19 energizes all AND gates in output gate 3–20 and causes digits stored in register 2–16 and the digit count in counter 2–14 and output on leads 3–65, 3–68, 3–66, 3–69, 3–67, and 3–31 to be gated out over leads 3-A, 3-A1 to A8, 3-B, 3-B1, to B8, 3-C, 3-C1 to C8, 3-D, and 3-D1 to D8 to common check circuit 3-22 where a restricted call determination is made. If the call being established over line 3–27*a* is restricted, a call restrict signal is returned over lead 3-R within the 50-microsecond period the contents of register 2–16 and counter 2–14 are being checked. The restrict signal is registered in call status register 3–24 as described hereinafter.

Advantageously, scanner 3–18 is free running in order to simplify control circuit 3–17 in accordance with the teaching of our invention. Complex circuitry in control circuit 3–17 for starting and stopping scanner 3–18 in response to start scan signals from digit registers is eliminated. Complex circuitry in register 2–16 for generating a start scan signal only after each digit registered therein is also eliminated. As a result of allowing scanner 3–18 to free run, many restricted call determinations are made of the existing contents of digit register 2–16 and digit counter 2–14, and of the registers and counters associated with the other line circuits after each digit stored therein. This includes the periods when no calls are being placed over the assoicated line. This, however, does not adversely affect the operation of the call denial circuit.

RESTRICTED CALL DETERMINATION

Common check circuit 3–22 in FIG. 3 sequentially receives the contents of digit register 2–16 and digit counter 2–14 or the contents of other registers and counters, as previously described, and, in a manner well known in the art, determines whether the information received indicates a restricted call is being placed, PBX customer selected allowed three-digit codes are programmed into check circuit 3–22 by placing appropriate cross-connections between the terminals of cross-connection field 3–43. In the event a restricted call is determined at any of the times scanner 3–18 has caused the contents of register 2–16 and counter 2–14 to be gated out to check circuit 3–22, the check circuit generates a call restrict signal which is delayed for about 30 milliseconds and is then returned via lead 3-R to our novel call status register 3–24 in control circuit 3–17. The restrict signal is also present at the call status registers of the other line circuits, but the concurrent presence of the scan pulse at call status register 3–24 only allows the call restrict signal to be registered therein as now described.

Prior to a call being placed over line 2–27*a*, flip-flops 3–58 and 3–59 in call status register 3–24 are in a normal state wherein their zero output is high and their one output is low. In this normal state the two inputs of AND gate 3–60 connected to the zero output of flip-flops 3–58 and 3–59 are high. Every scan pulse on lead 3–19 is applied to toggle input T of flip-flop 3–58 and the third input of gate 3–60. Scan pulses thereby cause all three inputs of gate 3–60 to be high and, in response thereto, each scan pulse is passed by the gate to toggle input T of flip-flop 3–59. Flip-flop 3–59 remains in its zero state until a call restrict signal returned over lead 2-R is present at its input D while a scan pulse is concurrently present at its toggle input T.

In the event check circuit 3–22 determines a restricted call is being placed over line 2–27*a*, input D of flip-flop 3–59 is high due to the delayed call restrict signal on lead 3-R and the readout scan pulse is concurrently present at its toggle input T. Flip-flop 3–59 is responsive to the trailing edge of the scan pulse to be switched to its one state and thereby causes relay driver 3–61 to operate relay 3–NG. Break contacts 2-NG1 and 2-NG2 thereof disconnect the calling PBX station from line 2–27*a* while make contacts 2-NG1 and 2-NG2 reconnect the station to recorded announcement 2–25 which gives instructions to hang up and recall the PBX operator in order to complete the call.

With flip-flop 3–59 in its one state, its zero output is low and gate 3–60 cannot pass further scan pulses to input T of the flip-flop. Flip-flop 3–59 thereby remains in its one state till returned to its zero state by a pulse at its reset input RS caused by an on-hook condition of the calling PBX station, as described further in the specification.

An allowed call over line 2–27*a* causes call status register 3–24 to be disabled for the duration of the call. Following registration of the "C" digit the output of digit counter 2–14 to lead 2–31 goes high. This high output is connected via lead 3–31 to input D of flip-flop 3–58. Immediately thereafter, a scan pulse applied to toggle input T of flip-flop 3–58 which is responsive to the trailing edge of the scan pulse to switch to its one state. As flip-flop 3–58 responds to the trailing edge of the scan pulse, its operation is delayed so that its zero output does not immediately go low. Thus, if a call is determined to be restricted after the third digit registered, this particular scan pulse is passed by gate 3–60 to toggle flip-flop 3–59 to its one state as previously described. At the end of the 40 microsecond period the zero output of flip-flop 3–58 goes low and gate 3–60 is thereby disabled from passing further scan pulses to input T of flip-flop 3–59. Flip-flop 3–58 remains in its one state till reset at the termination of the call over line 2–27*a* as described immediately hereinafter.

TERMINATION OF A CALL

Placing the calling PBX station on-hook, following a restricted or completed call, interrupts the supervisory current flowing over leads 2–T*a* and 2–R*a* of line 2–27*a*, and, in a manner well known in the art, causes line relay 2-L to release.

As mentioned briefly heretofore, retriggerable multivibrator 2–26 is responsive to openings and closings of contact 2-L1 to detect only an on-hook supervisory condition on line 2–27*a*. This is accomplished in the following manner. The closure of contact 2-L1 for an off-hook condition connects potential 2–32 to the input of multivibrator 2–26. The output of multibrator 2–26 immediately goes from high to low and makes clearing input CLR of counter 2–14, reset inputs RS of flip-flop 2–58 and 2–59, and clearing inputs CLR of registers 2–39, 2–36, and 2–34 which are all connected to the output thereof to go low, thus enabling these circuits for the existing call. The high at these inputs prior to the start of a call cleared and reset the circuits from a previous call. Multivibrator 2–26 has a timing period of 200 milliseconds and its output returns to its normal high state 200 milliseconds after potential 2–32 is disconnected from its input. Opening of contact 2-L1 in response to dial pulses does not allow multivibrator 2–28 to time out for each opening is in the order of 70 milliseconds duration. The only time contact 2-L1 remains open for greater than 200 milliseconds is upon an on-hook condition on line 2–27*a* and, at that time, multivibrator 2–26 times out and its output returns to its normal high state which is used to clear other circuits in line circuit 2–11*a* as mentioned previously. The output of multivibrator 2–26 is connected to clearing inputs CLR of digit counter 2–14, and registers 2–34, 2–36, and 2–39, and to reset inputs RS of flip-flops 3–58 and 3–59. The high output causes these counters, registers, and flip-flops to be cleared to zero or returned to their zero state to await another call over line 2–27*a*. The return of flip-flop 3–59 to its zero state causes the release of relay 3-NG, assuming it is operated, and its break contacts 2-NG1 and 2-NG2 reconnect outgoing trunk 2–29 to line 2–27*a*.

It should be understood that the above-described embodiment of our invention is merely illustrative of the teaching of our invention and varied other embodiments may readily be devised by those skilled in the art without departing from the scope of our invention.

What is claimed is:

1. Call denial equipment for blocking automatic completion of selected calls being placed over a plurality of telephone lines to a central office comprising means connected to each of said lines responsive to the receipt of signals thereover for recording call directing digits, means associated with each said recording means for counting the number of digits recorded, means selectively connectable to individual ones of said lines for checking the recorded contents of each one of said recording means as well as the number of digits in the associated one of said counting means to determine a denied call by comparison against a prescribed list of allowed codes, gate means associated with said individual lines being selectively enabled for coupling the associated one of said recording means and said counting means to said checking means, and a continuously running scanner gererating a scan pulse for each of said gate means to sequentially enable each of said gate means cyclically in a predetermined order whether or not there are contents in particular ones of said recording means and at a rate such that the contents of each of said recording means are checked at least once after the recording of a digit therein.

2. The invention in accordance with claim 1 wherein said invention further includes means for generating a restrict signal when a denied call is determined, and a call status register associated with each of said lines for receiving said restrict signal comprising a first toggle flip-flop having two stable states and having a first input connected to said restrict signal generating means, said first flip-flop being controllable to transfer from a first state to a second state upon the concurrent receipt of said restrict signal at said first input and of the associated one of scan pulses from said scanner at a toggle input of said first flip-flop, said first flip-flop being in said second state causing termination of the call over the associated one of said lines.

3. The invention in accordance with claim 2 wherein said call status register further comprises logic means for performing an AND function, said logic means being jointly responsive to said first flip-flop being in said first state and to said scan signal for applying said scan signal to said toggle input of said first flip-flop.

4. The invention in accordance with claim 3 wherein said call status register further comprises a second toggle flip-flop having two stable states and having a first input connected to said digit counting means, said second flip-flop being controllable to transfer from a first state to a second state upon the concurrent receipt of a signal from said counting means indicating that a predetermined number of digits have been recorded and of a scan signal at a toggle input of said second flip-flop, said second flip-flop controlling said logic means to apply said scan signal to said toggle input of said first flip-flop only when said second flip-flop is in its said first state, said second flip-flop thereby disabling said first flip-flop from being placed in its said second state following recording of said predetermined number of digits.

5. The invention in accordance with claim 4 further comprising means associated with each of said lines and activated upon the receipt of each dialed digit for incrementing said digit counting means to provide a cumulative received digit count.

6. The invention in accordance with claim 5 wherein said recording means comprises a pulse counter for counting dial pulses of each dialed digit over the associated one of said lines, and means responsive to said digit counting means being incremented for registering the pulse count contents of said pulse counter.

7. Call denial equipment for blocking automatic completion of selected calls being placed over a plurality of PBX lines to a central office comprising a pulse counter associated with each of said lines for counting dial pulses of each digit dialed over said associated line, means associated with each of said lines for counting the number of digits dialed, means associated with each of said lines and activated upon the receipt of each dialed digit for incrementing said digit counting means to provide a cumulative received digit count, means responsive to the incrementation of said digit counting means for registering the pulse count contents of said pulse counter, means selectively connectable to individual ones of said lines for checking the contents of said registering means and said digit counting means associated therewith to determine a denied call by comparison against a prescribed list of allowed calls, said checking means generating a restrict call signal for a denied call, gate means associated with individual ones of said lines and selectively enabled for coupling the contents of said registering means and said digit counting means to said checking means, a continuously running scanner generating scan pulses that sequentially enable ones of said gate means cyclically 9n a predetermined order, each of said gate means being enabled by a scan pulse at least once after the registration of the pulse count of each digit in said registering means, and a call status register associated with each of said lines, each of said call status registers being enabled in response to the one of said scan pulses that enables said gate means associated with the corresponding one of said lines to receive said restrict signal.

8. The invention in accordance with claim 7 further comprising a first retriggerable one-shot multibibrator individually associated with each of said lines and being retriggered by dial pulses for each dialed digit to generate an elongated pulse ending after dial pulsing of each dialed digit, said digit counting means being incremented in response to the end of each elongated pulse to provide a cumulative received digit count, and said pulse counter being responsive to the end of each elongated pulse to clear said pulse counter to count dial pulses of a subsequently dialed digit.

9. The invention in accordance with claim 8 further comprising a second retriggerable one-shot multivibrator individually associated with each of said lines, said second multivibrator being responsive to supervisory signals on said lines to generate an elongated pulse ending only upon an on-hook condition on the associated one of said lines, said digit counting means, said registering means, and said status register being responsive to the end of said last-mentioned elongated pulse to be cleared to process a subsequent call over the associated one of said lines.

10. A control circuit for use in call denial equipment which includes a register associated with each of a plurality of lines to a central office for storing digits dialed over said lines, a digit counter associated with each of said lines for counting the number of digits dialed over said lines, and a check circuit individually associated with the ones of said registers and said digit counters associated with ones of said lines for determining if the contents thereof indicate a restricted call is being placed, said check circuit generating a restrict signal upon a determination that a restricted call is being placed, said control circuit comprising a free-running scanner providing scan signal outputs for sequentially causing the contents of said registers and said counters to be gated out to said check circuit, logic AND gate means associated with each of said registers and counters, one of two inputs of each of said gate means being connected to the associated ones of said registers and counters, the second input of each of said gate means associated with each of said lines being connected to a respective output of said scanner, said scanner sequentially energizing each of said gates to gate out the contents of said registers and counters to said check means for a restricted call determination, a plurality of first toggle-flip-flops, one of which is associated with each of said lines for registering a restrict signal generated in response to a restricted call determination being made by said check circuit, said first flip-flops normally being in a first state, each of said first flip-flops having a signal input energized by each restrict signal generated by said check circuit, each of said flip-flops having a toggle input energized in response to said respective scan signal outputs of said scanner, said first flip-flops being placed in a second state upon the concurrent presence of a restrict signal and a scan signal at the inputs of one of said flip-flops, and said first flip-flops being in said second state causing a call over the associated one of said lines to be terminated, a plurality of second toggle flip-flops a different one being associated with each of said first flip-flops for disabling said first flip-flops to prevent registration of a restrict signal following the dialing of a predetermined number of digits on a call over the associated one of said lines, each of said second flip-flops normally being in a first state and having a signal input thereof connected to the associated one of said digit counters, each of said counters generating a first signal which energizes said signal input of the associated one of said second flip-flops upon said counters counting said predetermined number of digits, a toggle input of each of said second flip-flops being energized by said respective scan signal outputs, said second flip-flops being placed in a second state upon the concurrent presence of a scan signal and a first signal at the inputs of ones of said second flip-flops, said second flip-flops being in said second state causing the associated ones of said first flip-flops to be disabled from registering a restrict signal, and a three input logic AND gate associated with each of said first flip-flops for gating scan signals from said scanner to said signal inputs thereof, a first input of said three input gate connected to the associated one of said first flip-flops and energized upon said last-mentioned first flip-flops being in their said first state, a second input of said three input gate connected to the associated one of said second flip-flops and being energized only upon said last-mentioned second flip-flops being in their said first state, a third input of said three input gate being directly energized by a scan signal from said respective scan output, said three input gate gating said last-mentioned scan signals to said toggle input of the associated ones of said first flip-flops until the associated one of said second flip-flops is placed in its said second state.

* * * * *